(12) United States Patent
Kawasaki et al.

(10) Patent No.: US 10,309,819 B2
(45) Date of Patent: Jun. 4, 2019

(54) METHOD OF ESTIMATING GAS EMISSION AMOUNT

(71) Applicant: JGC CORPORATION, Yokohama (JP)

(72) Inventors: Masahiro Kawasaki, Kanagawa (JP); Takashi Iitsuka, Kanagawa (JP); Kenichiro Kado, Kanagawa (JP); Manabu Kumagami, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 0 days.

(21) Appl. No.: 16/065,130

(22) PCT Filed: Mar. 4, 2016

(86) PCT No.: PCT/JP2016/056799
§ 371 (c)(1),
(2) Date: Jun. 22, 2018

(87) PCT Pub. No.: WO2017/149760
PCT Pub. Date: Sep. 8, 2017

(65) Prior Publication Data
US 2019/0017858 A1 Jan. 17, 2019

(51) Int. Cl.
*G01F 22/02* (2006.01)
*F17C 13/02* (2006.01)
(Continued)

(52) U.S. Cl.
CPC .............. *G01F 22/02* (2013.01); *F17C 13/02* (2013.01); *F16C 13/026* (2013.01); *G01F 23/14* (2013.01)

(58) Field of Classification Search
CPC ......... G01F 22/02; F17C 13/02; F17C 13/026
See application file for complete search history.

(56) References Cited

U.S. PATENT DOCUMENTS

| | | | |
|---|---|---|---|
| 2005/0017634 A1* | 1/2005 | Kamio | H01J 9/241 313/553 |
| 2012/0022841 A1* | 1/2012 | Appleyard | G06F 17/12 703/2 |
| 2016/0271555 A1* | 9/2016 | Hiltzik | F02M 25/0854 |

FOREIGN PATENT DOCUMENTS

| | | |
|---|---|---|
| JP | H04-13513 | 3/1992 |
| JP | 2015175488 | 10/2015 |

OTHER PUBLICATIONS

"International Search Report (Form PCT/ISA/210)" of PCT/JP2016/056799, dated Mar. 29, 2016, with English translation thereof, pp. 1-2.

* cited by examiner

*Primary Examiner* — David Z Huang
(74) *Attorney, Agent, or Firm* — JCIPRNET

(57) ABSTRACT

For estimation of the gas emission amount from a storage tank for storing a liquid containing the volatile compounds therein, preconditions involving a tank shape of the fixed roof type storage tank and a working pressure of a relief valve are set in a first step, and initial conditions for storage volumes, temperatures, and pressures of the liquid and a gas inside the storage tank are set in a second step. In a third step, an inflow or outflow heat quantity to or from the liquid and the gas inside the storage tank is determined so that a mass transfer amount between the liquid and the gas is obtained through CFD analysis. In a fourth step, whether or not the relief valve is actuated and the gas emission amount through the relief valve are obtained based on the mass transfer amount.

10 Claims, 7 Drawing Sheets

(51) Int. Cl.
*F16C 13/02* (2006.01)
*G01F 23/14* (2006.01)

METHOD OF ESTIMATING GAS EMISSION AMOUNT

CROSS-REFERENCE TO RELATED APPLICATION

This application is a 371 application of the international PCT application serial no. PCT/JP2016/056799, filed on Mar. 4, 2016. The entirety of each of the abovementioned patent applications is hereby incorporated by reference herein and made a part of this specification.

TECHNICAL FIELD

The present invention relates to a technology of estimating a gas emission amount through a relief valve, which is provided to a storage tank for storing a liquid containing volatile compounds therein.

BACKGROUND ART

In fixed roof type storage tanks for storing petroleum products or the like therein, a gas-phase space is formed above a liquid (liquid phase) stored in the storage tank. For example, when a temperature inside the storage tank rises, the amount of evaporation of a gas from a surface of the liquid is increased to increase a pressure of the gas in the gas-phase space. In order to prevent an excessive stress from being applied to a main body of the storage tank along with the pressure rise, a relief valve for venting the gas present in the space to the outside when the pressure of the gas becomes higher than a predetermined pressure is provided to a roof of the storage tank (for example, FIG. 1 of Patent Literature 1).

Some petroleum products and the like, which are liquids in the storage tank, contain volatile organic compounds (VOC) such as benzene and toluene corresponding to volatile compounds. In this case, a VOC recovery unit for recovering the VOC contained in the gas vented through the relief valve is sometimes provided in terms of environmental conservation or the like.

On the other hand, the temperature inside the storage tank varies from day to day in accordance with weather conditions. Even during a single day, the temperature inside the storage tank and the pressure in the gas-phase space momentarily change in accordance with the presence/absence of sunlight during day or night or a change in the amount of sunlight along with movement of the sun during the day. Therefore, it is difficult to precisely obtain the gas emission amount vented through the relief valve. Therefore, hitherto, capacity of treating the emission gas in the VOC recovery unit has been designed based on an instantaneous emission amount through the relief valve, which is defined in industry standards such as American Petroleum Institute (API) 2000.

However, specifications of the relief valves defined in the industry standards are determined based on the amount of evaporation of the gas, which is generated under the most severe conditions, without consideration of a difference in area where the storage tank is installed and thermal conduction properties (for example, with or without heat retention) of the main body of the storage tank. Therefore, in comparison to an actual gas emission amount, a capacity of the VOC recovery unit installed together with the storage tank tends to be excessively large.

CITATION LIST

Patent Literature

[PTL 1] JP H04-13513 Y2

SUMMARY OF INVENTION

Technical Problem

The present invention has been made in the context described above, and provides a method of estimating a gas emission amount, capable of more precisely estimating the gas emission amount from a fixed roof type storage tank for storing a liquid containing volatile compounds therein.

Solution to Problem

According to one embodiment of the present invention, there is provided a method of estimating a gas emission amount from a storage tank for storing a liquid containing volatile compounds therein, the method including:

a first step of setting preconditions relating to: (a) a tank shape of the storage tank of fixed roof type including a relief valve; (b) a working pressure of the relief valve; (c) thermodynamic physical properties of the liquid inside the storage tank; and (d) thermodynamic physical properties of a gas inside the storage tank;

a second step of setting initial conditions for a storage volume, a temperature, and a pressure for each of the liquid and the gas inside the storage tank;

a third step of obtaining a mass transfer amount between the liquid and the gas by determining an inflow heat quantity to or an outflow heat quantity from the liquid and the gas through a partition wall of the storage tank and calculating a change in temperature of the liquid and a change in temperature of the gas and a change in vapor-liquid equilibrium condition through computational fluid dynamics analysis; and a fourth step of obtaining a pressure change of the gas based on the mass transfer amount so as to obtain the gas emission amount vented through the relief valve when a pressure of the gas after the pressure change exceeds a working pressure of the relief valve.

The method of estimating a gas emission amount may include the following characteristics.

(1) The relief valve includes a discharge vent, and the gas vented through the relief valve is vented through the discharge vent to a recovery unit for recovering the volatile compounds contained in the gas.

(2) The storage tank includes a breather valve, and the first step further includes: (e) setting a working pressure of the breather valve as one of the preconditions, and the fourth step includes obtaining an intake amount of the gas to be sucked through the breather valve when the pressure of the gas after the pressure change is lower than the working pressure of the breather valve. In this case, the breather valve includes an intake vent, and the gas to be sucked through the breather valve includes an inert gas supplied through the intake vent.

(3) The third step includes identifying the change in temperature of the liquid, the change in temperature of the gas, and the change in the vapor-liquid equilibrium condition by calculating heat transfer due to convection of the liquid and the gas through the computational fluid dynamics analysis.

(4) The method of estimating a gas emission amount includes setting new initial conditions for the second step based on the change in temperature of the liquid and the change in temperature of the gas, which are obtained in the third step, the change in pressure of the gas, which is obtained in the fourth step, and the storage volume of the gas in the storage tank, which is obtained from the change in pressure; implementing the third step and the fourth step by defining a new inflow heat quantity to or a new outflow heat quantity from the liquid and the gas after the new initial conditions for the second step are set; and obtaining a temporal change in the gas emission amount vented through the relief valve by repeating the setting of the new initial conditions for the second step and the implementation of the subsequent third step and fourth step.

(5) In Item (4), a maximum emission flow rate per unit time or a total gas emission amount vented within a preset time period is obtained based on the temporal change in the gas emission amount vented through the relief valve.

(6) The inflow heat quantity to or the outflow heat quantity from the liquid and the gas, which is determined in the third step, is determined based on heat energy supplied from sunlight to the storage tank through the partition wall. The heat energy supplied from the sunlight is determined from latitude and longitude of a spot where the storage tank is installed and a calendar day.

(7) The gas inside the storage tank contains the volatile compounds and other compounds, and an emission amount of the volatile compounds is obtained based on the mass transfer amount between the liquid and the gas, which is obtained in the third step, and the gas emission amount obtained in the fourth step.

Advantageous Effects of Invention

According to the present invention, the mass transfer amount between the liquid and the gas inside the storage tank is identified based on the inflow heat quantity to or the outflow heat quantity from the liquid containing the volatile compounds, which is stored in the storage tank. Then, the gas emission amount through the relief valve is obtained based on the mass transfer amount. Therefore, a precise gas emission amount can be obtained.

DESCRIPTION OF EMBODIMENTS

Figure 1:
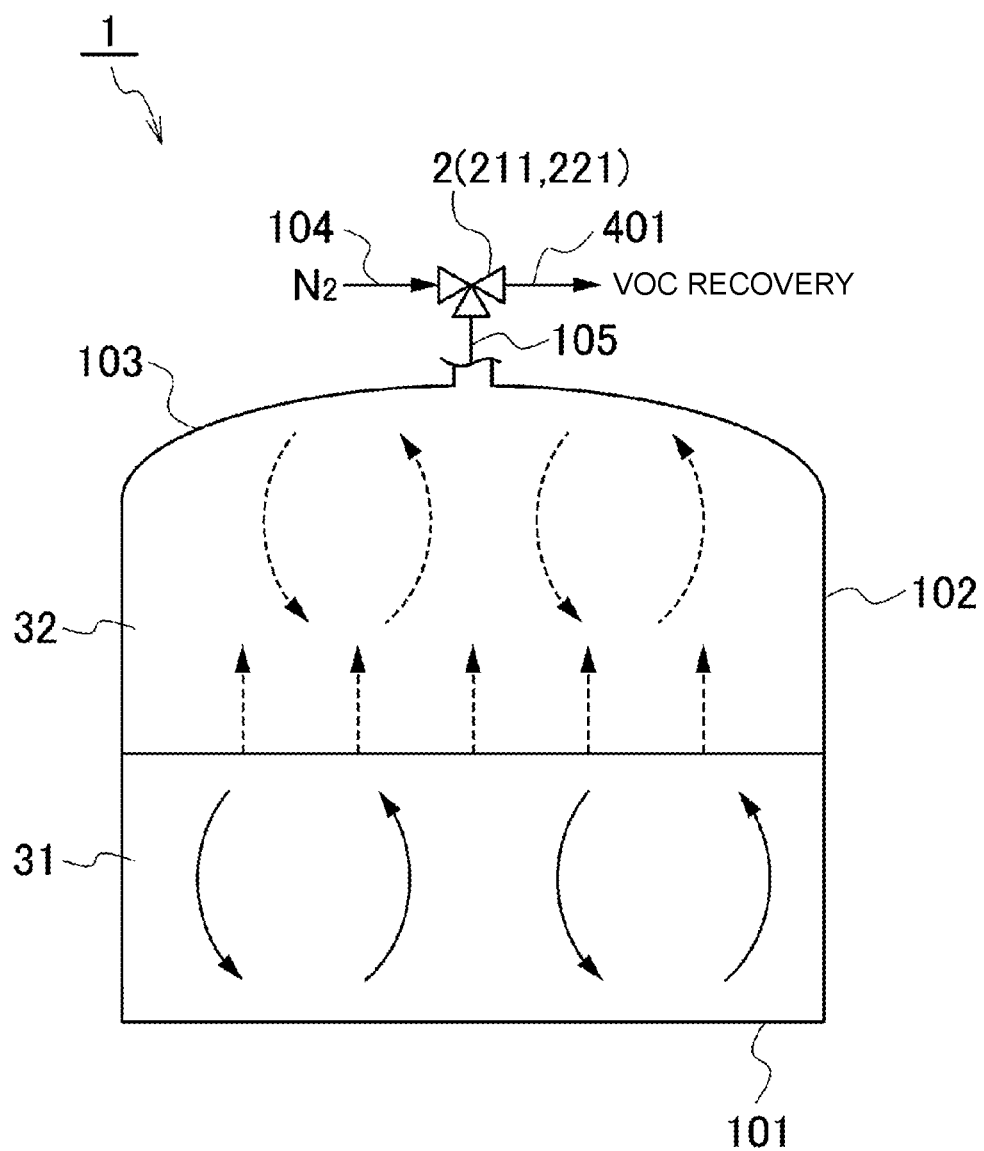
FIG. 1 is a schematic diagram of a storage tank according to an embodiment of the present invention.

FIG. 1 is a diagram for schematically illustrating a storage tank 1 for liquid, which is a target of gas emission amount estimation. The storage tank 1 is configured as, for example, a reservoir having an upper surface and a lower surface of a cylindrical side wall portion 102 respectively closed by a fixed roof portion 103 and a bottom plate portion 101. The storage tank 1 is not particularly limited in shape except for being of fixed roof type with the fixed roof portion 103 fixed to an upper side of the side wall portion 102. For example, the fixed roof portion 103 may be a doom roof or a cone roof, or may have other shapes. Besides, the storage tank 1 may have a cuboidal shape or be of horizontal type with an axis of the cylindrical reservoir being oriented horizontally.

In FIG. 1, there is illustrated an example of the storage tank 1 including the doom-roof type fixed roof portion 103 provided on the upper surface of the side wall portion 102 having the cylindrical shape.

The storage tank 1 may be of aboveground type to be installed aboveground or of semi-underground type in which the whole storage tank 1 except for the fixed roof portion 103 or a lower side of the side wall portion 102 is buried underground. Further, the storage tank 1 may be of offshore type to be floated on the ocean.

In addition to a receiving line for receiving a liquid being an object to be stored and a delivery line for delivering the liquid, various types of ancillary equipment including transport pumps provided to the lines described above, a tank mixer for mixing a liquid in the storage tank 1, heat retention equipment and heating equipment provided in accordance with properties of the liquid stored in the storage tank 1 and weather of an area where the storage tank 1, and the like are appropriately provided to the storage tank 1. In FIG. 1, the illustration of the above-mentioned ancillary equipment is omitted.

As the liquid to be stored in the storage tank 1, crude oil for petroleum refinery, crude oil for direct burning, intermediate products such as naphtha, petroleum products such as gasoline, kerosene, diesel, and heavy oil, and chemical products such as benzene and toluene can be exemplified. The liquid stored in the storage tank 1 contains volatile compounds that cause partial evaporation of the liquid along with a temperature rise and the like to increase a pressure in the storage tank 1 to such a degree that a relief valve 211 described later can be actuated.

In this example, the storage tank 1 for storing a liquid 31 being a petroleum product containing volatile organic compounds (hereinafter also referred to as "VOC") such as benzene or toluene as the volatile compounds is described.

For the storage tank 1, an upper limit value of a capacity for the liquid 31 that can be stored therein is defined. Above a liquid level of the liquid 31, a gas-phase space is formed. The gas-phase space is filled with a gas 32 containing the VOC evaporated from the liquid 31 and an inert gas described later, which flows into the gas-phase space from outside of the storage tank 1.

Further, a breather valve unit 2 including the relief valve 211 for venting the gas 32 in the storage tank 1 when an internal pressure rises and a breather valve 221 for sucking a gas into the storage tank 1 from outside when the internal pressure decreases is provided to the fixed roof portion 103 of the storage tank 1.

An outlet side of the relief valve 211 is connected to a VOC recovery unit described later through an exhaust line 401. An inlet side of the breather valve 221 is connected to a nitrogen-gas supply line 104 for supplying, for example, a nitrogen gas being the inert gas for sealing to the storage tank 1.

The gas sucked through the breather valve 221 is not limited to the inert gas. For example, when the storage tank 1 stores the liquid 31 that does not need gas seal, the breather valve 221 may be opened to suck atmospheric air.

Figure 2:
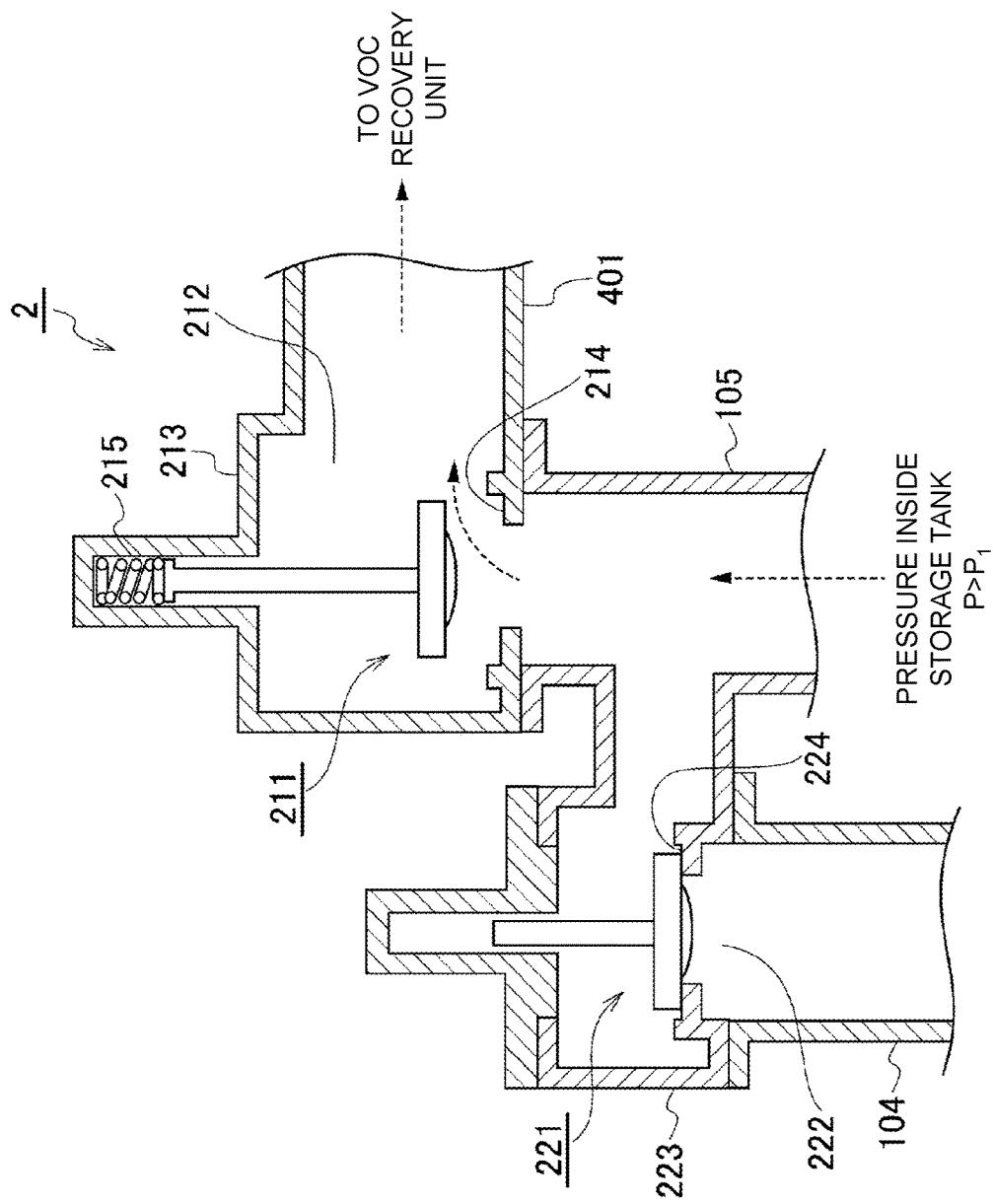
FIG. 2 is a first longitudinal side sectional view of a breather valve unit provided to the storage tank.
Figure 3:
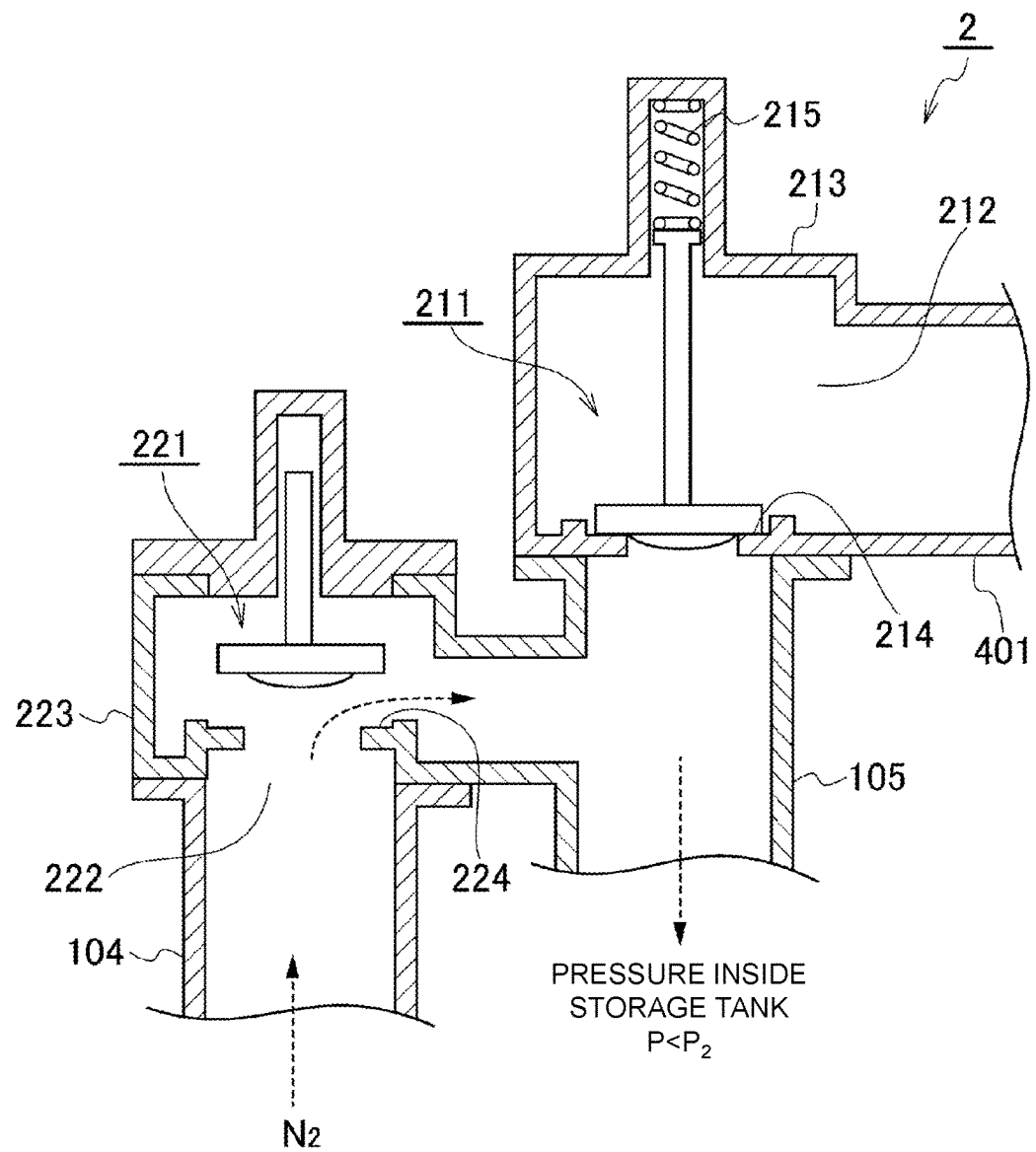
FIG. 3 is a second longitudinal side sectional view of the breather valve unit.

FIG. 2 and FIG. 3 are views for illustrating a configuration example of the breather valve unit 2. The breather valve unit 2 illustrated in FIG. 2 and FIG. 3 has a relief-vacuum valve structure in which a casing 213 for accommodating the relief valve 211 therein and a casing 223 for accommodating the breather valve 221 therein are connected in parallel to a connection line 105 provided to the storage tank 1.

The relieve valve 211 is urged downward by a spring 215, and is in a state of closing a valve seat 214 during a normal operation (FIG. 3). When a pressure inside the storage tank 1 rises so that the pressure P exceeds a preset working pressure $P_1$, the relief valve 211 is pushed up against an urging force of the spring 215 to vent the gas in the storage tank 1 through a discharge vent 212 (FIG. 2). In this example, the discharge vent 212 is connected to the exhaust line 401 for venting the gas toward the VOC recovery unit.

When the pressure inside the storage tank 1 decreases to become equal to or lower than a return pressure $P_1'$ of the relief valve 211 due to the gas emission, the relief valve 211 is pushed down by the spring 215 to close the valve seat 214.

The breather valve 221 is usually in a state of closing a valve seat 224 under self-weight (FIG. 2). When the pressure inside the storage tank 1 decreases and the pressure P becomes lower than a preset working pressure $P_2$, the breather valve 221 is lifted up due to a difference between a pressure on an upstream side and a pressure on a downstream side of the valve seat 224, thereby sucking the nitrogen gas from the nitrogen-gas supply line 104 toward the storage tank 1 through an intake vent 222 (FIG. 3). On an upstream side of the nitrogen-gas supply line 104, for example, a nitrogen-gas supply unit (not shown) including a liquid nitrogen tank and an evaporator is provided.

When the pressure inside the storage tank 1 increases to become equal to or higher than a return pressure $P_2'$ of the breather valve 221 due to the suction of the nitrogen gas, the relief valve 221 is lowered under the self-weight to close the valve seat 224.

The breather valve unit 2 is not limited to that having the relief-vacuum valve structure. For example, the breather valve unit 2 having a dead weight structure, which includes the relief valve 211 and the breather valve 221 arranged vertically so as to be accommodated in the same casing, may be adopted.

Further, in some cases, the breather valve 221 is arranged adjacent to the relief valve 211 to form the single breather valve unit 2 as illustrated in FIGS. 2 and 3. The breather valve 221 and the relief valve 211 are arranged independently of each other in some cases.

Figure 4:
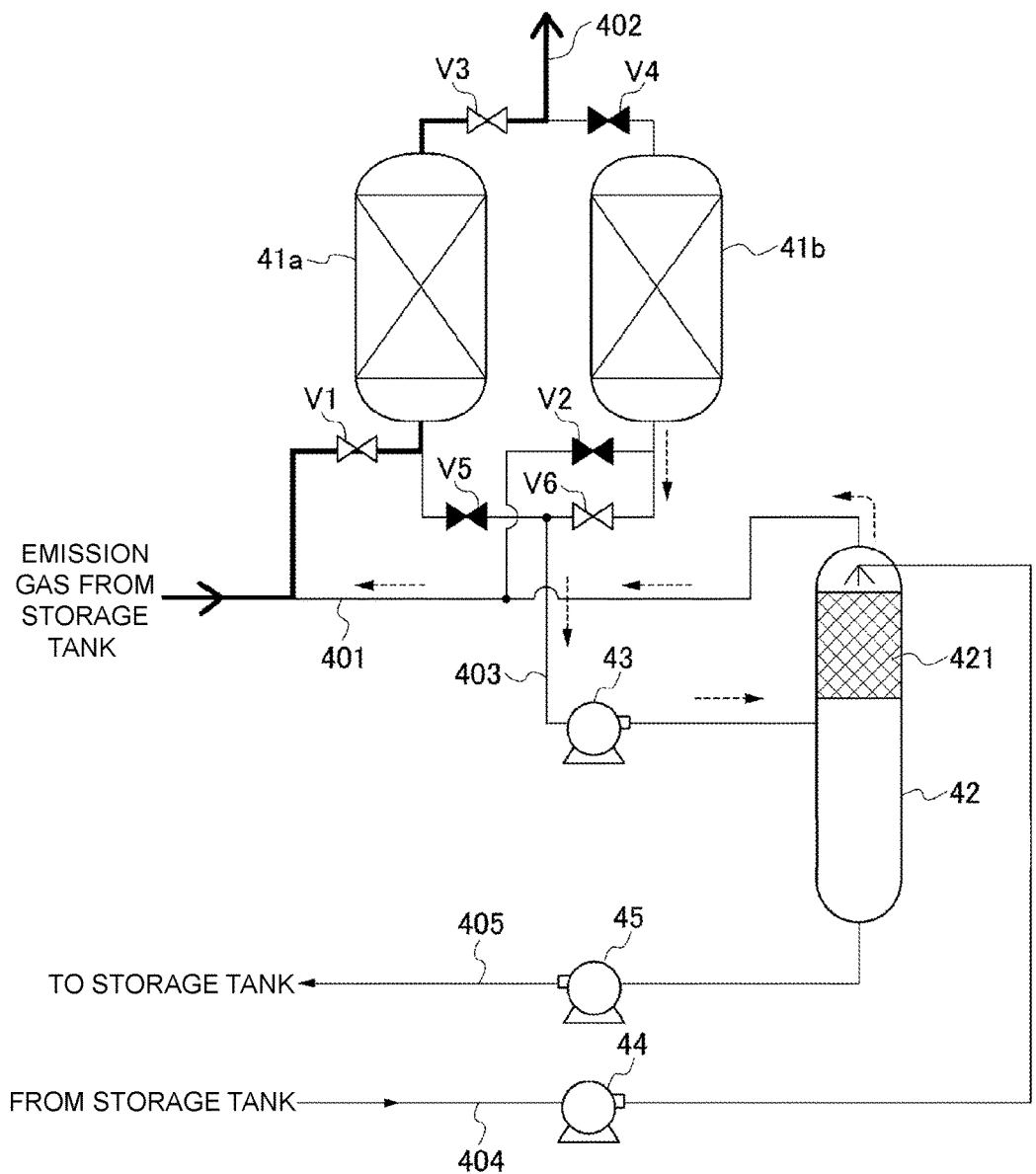
FIG. 4 is a configuration diagram of a VOC recovery unit installed together with the storage tank.

FIG. 4 is a configuration example of the VOC recovery unit that is provided on a downstream side of the discharge vent 212 of the breather valve unit 2. For each of open-close valves V1 to V6 illustrated in FIG. 4, those in an "open state" are illustrated in white, whereas those in a "closed state" are illustrated in black.

A plurality of, for example, two absorption columns 41a and 41b are connected in parallel to the exhaust line 401 through which the gas vented from the storage tank 1 flows. The adsorption columns 41a and 41b are filled with an adsorbent capable of adsorbing and removing the VOC contained in the gas, for example, activated carbon. On an outlet side of each of the adsorption columns 41a and 41b, an atmospheric vent line 402 for venting the gas from which the VOC has been removed to atmosphere.

In the example illustrated in FIG. 4, an adsorption operation of adsorbing and removing the VOC contained in the gas vented from the storage tank 1 is performed in the adsorption column 41a on one side. On the other hand, a regenerative operation of regenerating the adsorbent by separating the adsorption column 41b from the exhaust line 401 and the atmospheric vent line 402 and vacuum-sucking the adsorption column 41b so as to desorb the VOC from the adsorbent is performed in the adsorption column 41b on another side.

In the VOC recovery unit of this example, the operation of adsorbing the VOC and the operation of regenerating the adsorbent are alternately performed in the adsorption columns 41a and 41b.

A configuration of the VOC recovery unit through the operation of regenerating the adsorbent is now described. Desorbed-gas lines 403 for causing the VOC desorbed from the adsorbent during the regenerative operation to flow therethrough are connected to inlet sides of the adsorption columns 41a and 41b so as to be in parallel to the exhaust line 401. The desorbed-gas lines 403 respectively connected to the adsorption columns 41a and 41b join together on a downstream side to be connected to an intake side of a vacuum pump 43 that is common thereto. On a discharge side of the vacuum pump 43, an absorption column 42 for performing an operation of absorbing and removing the VOC through use of a solvent is provided. A separator for separating a lubricant discharged from the vacuum pump 43 may be provided between the vacuum pump 43 and the absorption column 42.

The absorption column 42 of this example uses a petroleum product that is the liquid 31 in the storage tank 1 as the solvent for absorbing the VOC. For example, the absorption column 42 is filled with a packing 421 for improving efficiency of the VOC and the solvent. The VOC discharged from the vacuum pump 43 is introduced to a side below a region filled with the packing 421.

On the other hand, the solvent drained from the storage tank 1 is dispersed and supplied to a side above the region filled with the packing 421 described above by a solvent feed pump 44 through the solvent supply line 404. The VOC and the solvent are brought into countercurrent contact with each other in the region filled with the packing 421, resulting in absorption and removal of the VOC by the solvent.

After being drained from an overhead of the absorption column 42 to flow into the exhaust line 401, the gas from which the VOC has been removed is further subjected to the absorption and removal of the VOC in the adsorption columns 41a and 41b and is then vented to the atmosphere. The solvent that has absorbed the VOC is drained from a bottom of the absorption column 42 by a solvent recovery pump 45 to be returned to the storage tank 1 through a solvent recovery line 405.

Although the example of the VOC recovery unit for recovering the VOC through use of the adsorbent has been described above, a method of treating the gas vented from the storage tank 1 is not limited to the example described above. For example, a VOC recovery unit for absorbing and removing the VOC by bringing the gas vented from the storage tank 1 into contact with the solvent may be provided. Alternatively, the VOC may be vented into the atmosphere after being combusted in a flare stack without the recovery of the VOC.

The structure of the storage tank 1 and the ancillary equipment thereof have been described above referring to FIG. 1 to FIG. 4. For the liquid 31 and the gas 32 that are present inside the storage tank 1, heat flows into the storage tank 1 through partition walls (bottom plate portion 101, side wall portion 102, and fixed roof portion 103) of the storage tank 1, and flows out from the liquid 31 and the gas 32 to the outside.

Then, when the heat flows into the storage tank 1 to increase a temperature of the liquid 31 and a temperature of the gas 32, the VOC component contained in the liquid 31 volatilizes. As a result, the pressure inside the storage tank 1 rises to actuate the relief valve 211 to implement the venting of the gas 32 in some cases. Further, when the heat inside the storage tank 1 flows out to lower the temperature of the liquid 31 and the temperature of the gas 32, the VOC contained in the gas 32 condenses. As a result, the pressure inside the storage tank 1 decreases to actuate the breather valve 211 to suck the nitrogen gas in some cases.

Further, convection due to an internal temperature difference occurs in the liquid 31 and the gas 32 (FIG. 1). Heat transfer or mass transfer occurring along with the convection affects a temperature at an interface between the gas and the liquid and a VOC concentration in the gas, which determine the volatilization and condensation of the VOC.

There are various factors including a change in temperature of air outside the storage tank 1 and reception from outside of a liquid having a temperature different from a temperature inside the storage tank 1 as factors of the change in temperature of the liquid 31 and the change in temperature of the gas 32 inside the storage tank 1.

Among the various factors, one of the greatest factors that affect a change in pressure of the gas 32 inside the storage tank 1 is thermal energy supply from sun 501. The thermal energy supplied from the sun 501 can be identified based on latitude and longitude of a spot where the storage tank 1 is installed and a calendar day. In a case of the northern hemisphere, for example, the thermal energy supplied from the sun 501 becomes maximum on a sunny summer solstice day.

Figure 5:
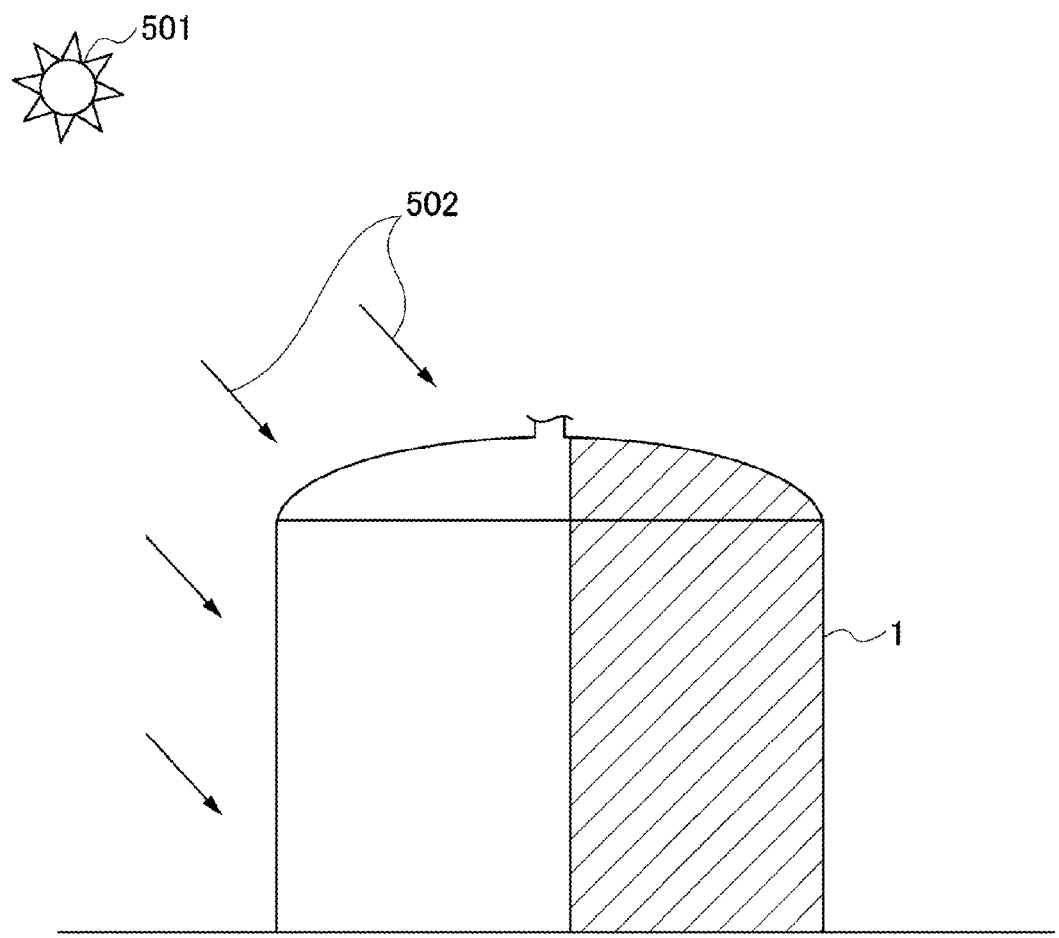
FIG. 5 is an explanatory view for illustrating a first solar irradiation state on the storage tank.
Figure 6:
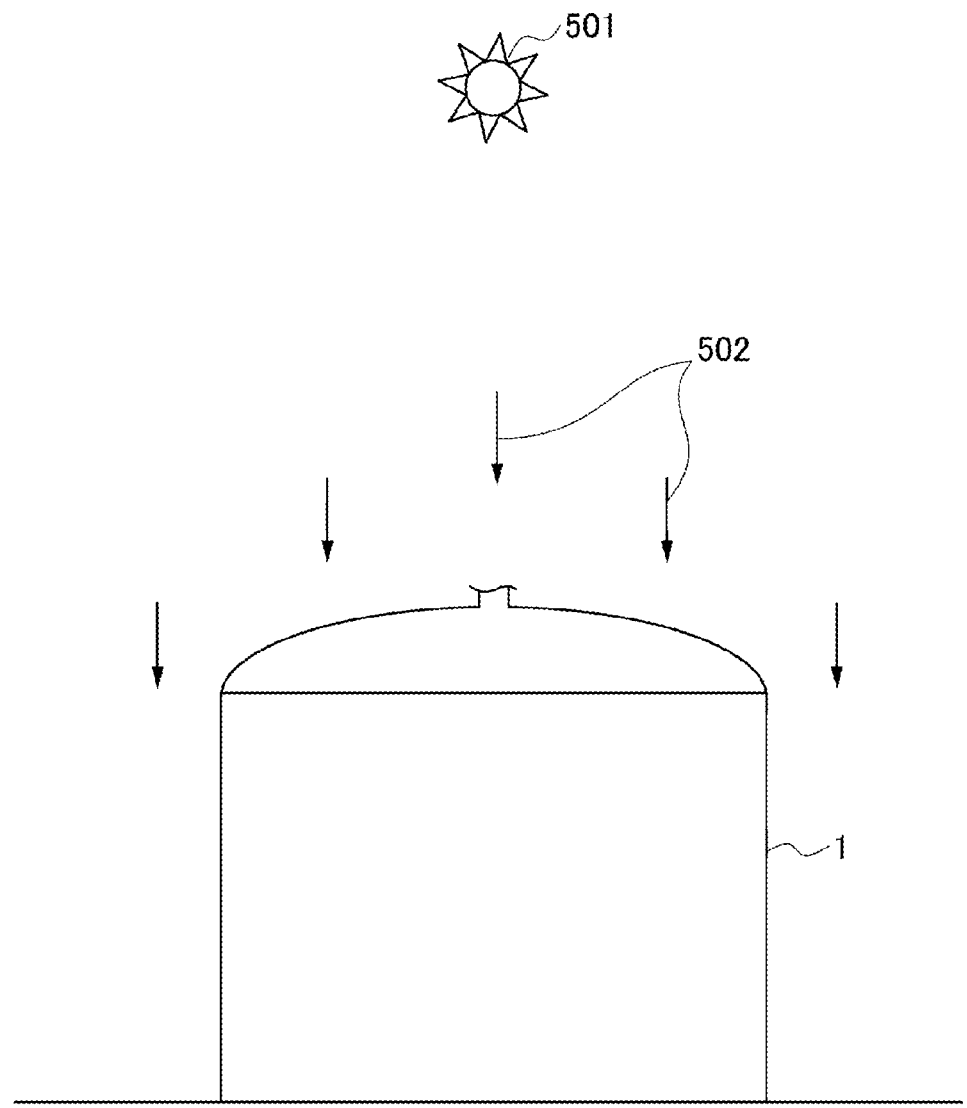
FIG. 6 is an explanatory view for illustrating a second solar irradiation state on the storage tank.

Further, as illustrated in FIG. 5 and FIG. 6, the thermal energy supplied from the sun 501 changes over time depending on a change in area of the partition walls of the storage tank 1 irradiated with sunlight 502 and a change in energy density per unit area of the partition walls along with the movement of the sun 501.

Therefore, an inflow heat quantity to or an outflow heat quantity from the liquid 31 and the gas 32 through the partition walls of the storage tank 1 differs depending on a position of the partition walls, and further changes over time at each position.

A method of estimating a gas emission amount according to the embodiment of the present invention creates a computational fluid dynamics (CFD) model in consideration of the above-mentioned configuration of the storage tank 1 and temperature change mechanisms of the liquid 31 and the gas 32 that are present inside so as to implement analysis. Then, based on the result of analysis, an emission amount of the gas vented from the relief valve 211 and an intake amount of the gas sucked through the breather valve 221 are estimated.

Figure 7:
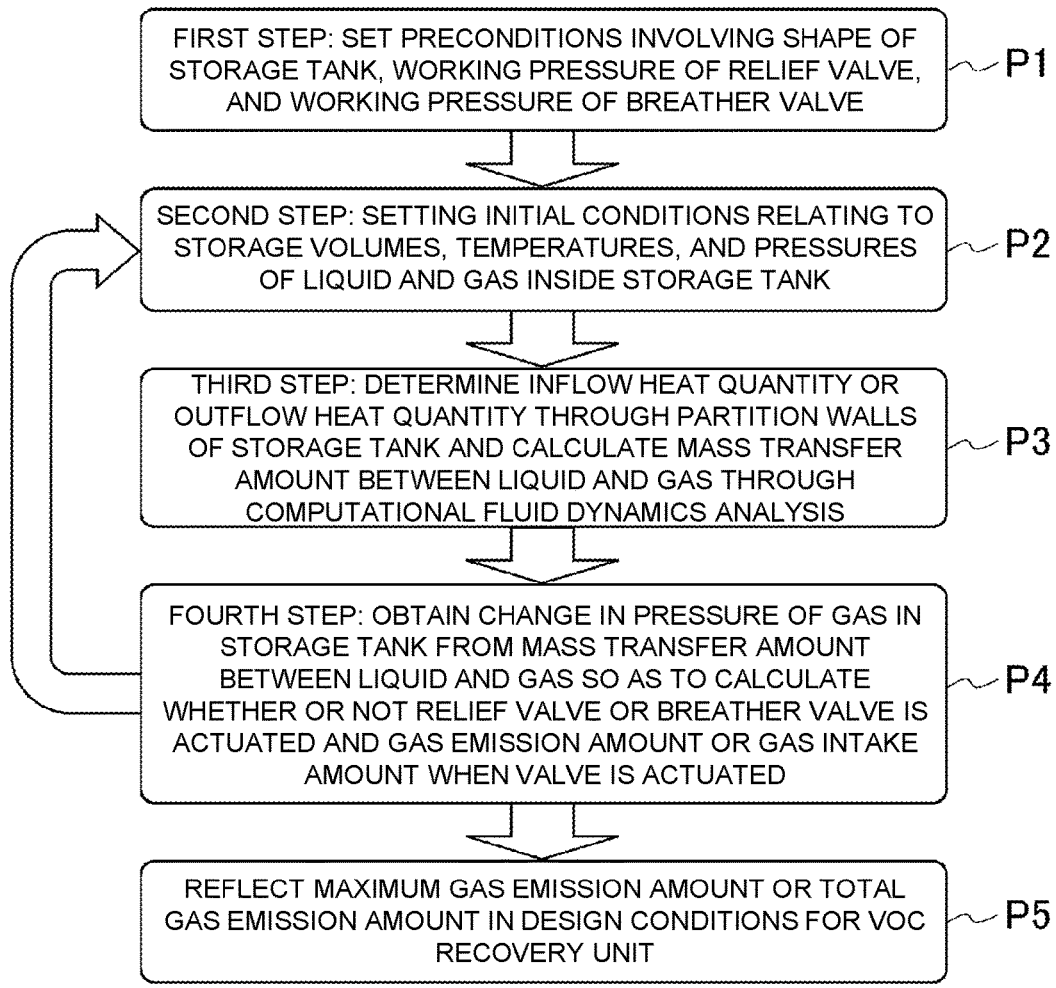
FIG. 7 is an explanatory view for illustrating a procedure of estimating a gas emission amount from the storage tank.

Now, a procedure of implementing the above-mentioned estimation is described referring to FIG. 7.

First, preconditions (a) to (e) necessary for CFD analysis and calculation of the emission amount and the intake amount of the gas, which involve a shape of the storage tank 1, working pressures of the relief valve 211 and the breather valve 221, thermodynamic physical properties of the liquid 31 and the gas 32 are determined (Step P1: first step).

(a) For the determination of the shape of the fixed roof type storage tank 1, various types of setting necessary for the CFD analysis in association with the shape of the storage tank 1 may be performed, such as setting of boundary positions of the bottom plate portion 101, the side wall portion 102, the fixed roof portion 103, and the like, a method of creating an analysis mesh in the liquid 31 and the gas 32.

(b) For the working pressure of the relief valve 211, in addition to the setting of the working pressure $P_1$ of the relief valve 211 at the time of the venting of the gas, which has been described referring to FIG. 2, the return pressure $P_1'$ used when the relief valve 211 closes the valve seat. 214, which has been described referring to FIG. 3, is set.

(c), (d) For the thermodynamic physical properties of the liquid 31 and the gas 32 inside the storage tank 1, various physical properties necessary for the CFD analysis, which involve specific heats, vapor pressures, densities, and viscosities of the liquid 31 and the gas 32, are set. When the above-mentioned physical properties have temperature dependency, a function or a table, which expresses a correspondence relationship between a temperature and a physical property value, may be set. Further, when the liquid 31 or the gas 32 contains a plurality of components, the above-mentioned physical properties may be set for each of the components. Alternatively, the physical properties may be set for a fluid mixture containing the plurality of components.

(e) For the working pressure of the breather valve 221, in addition to the setting of the working pressure $P_2$ of the breather valve 221 at the time of the sucking of the gas, which has been described referring to FIG. 3, the return pressure $P_2'$ used when the breather valve 221 closes the valve seat 224, which has been described referring to FIG. 2, is set.

Further, initial conditions relating to a storage volume, a temperature, and a pressure are set for the liquid 31 and the gas 32 inside the storage tank 1 (Step P2: second step).

After the storage volume of the liquid 31 inside the storage tank 1 is determined, a remaining region is the gas-phase space in which the gas 32 is present, thereby identifying a height position of the interface between the gas and the liquid. As the temperatures, an average temperature of the liquid 31 and an average temperature of the gas 32 inside the storage tank 1 may be set, or the temperatures may be set so that temperature distributions obtained in advance are reflected therein. Further, in general, the pressure is set for the gas 32. However, the pressure may be set for the liquid 31 as needed.

Thereafter, a distribution of the inflow heat quantity or the outflow heat quantity through the partition walls (bottom plate portion 101, side wall portion 102, and fixed roof portion 103) of the storage tank 1 is determined. A change in temperature of the liquid 31, a change in temperature of the gas 32, and a change in vapor-liquid equilibrium condition are calculated through the CFD analysis to obtain a mass transfer amount between the liquid and the gas (Step P3: third step).

For the determination of the distribution of the inflow heat quantity or the outflow heat quantity, the latitude and longitude of the spot where the storage tank 1 is installed and the calendar day can be taken into consideration. For example, when the maximum treating capacity of the VOC recovery unit is determined, in the case of the northern hemisphere, the heat energy supplied from the sun 501 is determined at a spot at predetermined latitude and longitude on a sunny summer solstice day on which the thermal energy supplied from the sun 501 becomes maximum.

Further, as described referring to FIG. 5 and FIG. 6, the inflow heat quantity or the outflow heat quantity at each position on the partition walls of the storage tank 1 is determined in consideration of an irradiated area with the sunlight 502 (region of the storage tank 1 illustrated in FIG. 5, which is hatched with diagonal lines, is not irradiated with the sunlight 502) in accordance with a position of the sun 501 or an energy density per unit area.

Further, for example, when a total emission amount of the gas through the relief valve 211 or a total intake amount of the gas through the breather valve 221 per day (preset time period) is to be obtained, an emission amount or an intake amount of the gas in a time zone after sunset, in which the thermal energy is not supplied from the sun 501, is required to be estimated. Therefore, the inflow heat quantity or the outflow heat quantity is determined in consideration of a temperature difference from a temperature of air outside the storage tank 1 in addition to the heat energy supplied from the sun 501 described above.

Further, when the storage tank 1 includes the heating equipment as described above, an inflow heat quantity from the heating equipment is also taken into consideration.

The various setting in the first step and the second step and the determination of the distribution of the inflow heat quantity or the outflow heat quantity in the third step are performed through software used for the CFD analysis and the like. The various setting in the first step and the second step and the determination of the distribution of the inflow heat quantity or the outflow heat quantity in the third step are not strictly distinguished from each other. It is apparent that items to be set in the respective steps may be set in parallel in accordance with specifications of the CFD analysis software and the like.

The software to be used for the CFD analysis may be commercially available general-purpose CFD analysis software or may be special-purpose CFD analysis software that is developed so as to implement the method of estimating the gas emission amount of this example.

For example, as a method capable of calculating the mass transfer amount between the liquid 31 and the gas 32, a calculation based on a vapor-liquid equilibrium theory and the like can be exemplified. Further, as a calculation method capable of calculating the convection of the fluid inside the storage tank 1, a finite volume method (FVM) and the like can be exemplified.

The change in temperature distribution of the liquid 31 and the change in temperature distribution of the gas 32 inside the storage tank 1 and the change in the vapor-liquid equilibrium condition at the interface between the gas and the liquid are calculated by a computer through use of the CFD analysis software to be used for the CFD analysis based on the items set in the respective steps described above, so that the mass transfer amount between the gas and the liquid (the amount of evaporation of the VOC from the liquid 31 into the gas 32 and the amount of condensation of the VOC from the gas 32 into the liquid 31) can be obtained.

Then, the change in pressure of the gas 32 inside the storage tank 1 is obtained from the mass transfer amount between the gas and the liquid so as to calculate whether or not the relief valve 211 or the breather valve 221 is actuated and the emission amount or the intake amount of the gas when the valve is actuated (Step P4: fourth step).

More specifically, when the pressure P of the gas 32 inside the storage tank 1 after the pressure change is larger than the working pressure $P_1$ of the relief valve 211, the relief valve 211 is actuated. Then, the amount of gas corresponding to a pressure difference $\Delta P_1 = P - P_1'$ between the pressure of the gas inside the storage tank 1 and the return pressure $P_1'$ of the relief valve 211 is vented through the relief valve 211. At this time, effects of a temperature decrease and a pressure decrease of the gas 32, which are caused along with adiabatic expansion, may be taken into consideration.

On the other hand, when the pressure P of the gas 32 inside the storage tank 1 after the pressure change is smaller than the working pressure $P_2$ of the breather valve 221, the breather valve 221 is actuated. Then, the amount of gas corresponding to a pressure difference $\Delta P_2 = P_2' - P$ between the pressure of the gas inside the storage tank 1 and the return pressure $P_2'$ of the breather valve 221 is sucked through the breather valve 221. At this time, the effects of the temperature rise and the pressure rise of the gas 32, which are caused along with adiabatic compression, may be taken into consideration.

A ratio (VOC concentration) of the VOC and other compounds contained in the vented gas can be identified by identifying the mass transfer amount between the gas and the liquid, the gas emission amount through the relief valve 211, and the gas (nitrogen gas) inflow amount through the breather valve 221. As a result, the emission amount of the VOC through the relief valve 211 can be obtained.

Further, the change in temperature of the liquid 31 and the change in temperature of the gas 32, which are obtained in the third step, the change in pressure of the gas 32, which is obtained in the fourth step, and the storage volume of the gas 32 in the tank 1, which is obtained from the emission amount/intake amount of the gas along with the actuation of the relief valve 211 and the breather valve 221, can be used as initial conditions for a new calculation that is performed when the position of the sun 501 changes or the like.

Then, after a distribution of new inflow heat quantity or outflow heat quantity in consideration of the above-mentioned temporal effects (region irradiated with the sunlight 502, energy density per unit area, whether or not the sunlight 502 is radiated, a change in temperature difference from the outside air) is determined, the third step and the fourth step are implemented.

The second to fourth steps described above are repeated. As a result, a temporal change in the emission amount of the gas vented through the relief valve 211 can be obtained.

Here, when the CFD analysis software is capable of performing dynamic analysis in consideration of the change in inflow heat quantity or outflow heat quantity, it is apparent that a temporal change in the emission amount of the gas vented through the relief valve 211 can be obtained through dynamic analysis of the CFD in place of the above-mentioned technique of repeatedly implementing the second to fourth steps.

As described above, when the temporal change in the emission amount of the gas through the relief valve 211 can be obtained, a maximum emission flow rate of the gas per unit time or a total emission amount of the gas vented within a preset time period (for example, one day) can be obtained.

Further, the emission amount of the VOC can be calculated from the VOC concentration in the gas. Therefore, the emission amount of the VOC can be reflected in the amount of adsorbent that fills the adsorption columns 41*a* and 41*b*, a flow rate of the solvent to be supplied to the absorption column 42, capabilities of the various pumps 43, 44, and 45, and the like in the VOC recovery unit (P5).

Further, as described above, the emission amount of the VOC can be reflected in the determination of the flow rate of the solvent in a case where the VOC recovery unit is of solvent absorption type and can be reflected in determination of a size of the flare stack in a case where the VOC is combusted in the flare stack.

According to the method of estimating the gas emission amount according to this embodiment, the mass transfer amount between the liquid 31 and the gas 32 inside the storage tank 1 is identified based on the inflow heat quantity to or the outflow heat quantity from the liquid 31 containing the VOC stored in the storage tank 1. Then, the gas emission amount through the relief valve 211 is obtained based on the mass transfer amount. Therefore, a precise gas emission amount can be obtained.

As a result, capability of the VOC recovery unit or the like can be appropriately determined. Thus, increase in equipment cost along with excessive estimation of the gas emission amount can be reduced.

Here, in the example described referring to FIG. 1 to FIG. 3, the gas vented through the relief valve 211 is guided through the discharge vent 212 toward the VOC recovery unit. However, forming the discharge vent 212 in the breather valve unit 2 is not indispensable. Even when the outlet side of the relief valve 211 is set in a state open to the atmosphere so that the gas vented from the storage tank 1 is vented to the atmosphere, it is apparent that the method of estimating the gas emission amount of this example can be applied. For example, when the storage tank 1 is installed at a place distant from an urban area, the method of estimating the gas emission amount can be used for examination for the necessity of installation of the VOC recovery unit in a case where the emission amount of the VOC is extremely small.

The invention claimed is:

1. A method of estimating a gas emission amount from a storage tank for storing a liquid containing volatile compounds therein, the method comprising:
a first step of setting preconditions relating to: (a) a tank shape of the storage tank of fixed roof type including a relief valve; (b) a working pressure of the relief valve; (c) thermodynamic physical properties of the liquid inside the storage tank; and (d) thermodynamic physical properties of a gas inside the storage tank;
a second step of setting initial conditions for a storage volume, a temperature, and a pressure for each of the liquid and the gas inside the storage tank;
a third step of obtaining a mass transfer amount between the liquid and the gas by determining an inflow heat quantity to or an outflow heat quantity from the liquid and the gas through a partition wall of the storage tank and calculating a change in temperature of the liquid and a change in temperature of the gas and a change in vapor-liquid equilibrium condition through computational fluid dynamics analysis; and
a fourth step of obtaining a pressure change of the gas based on the mass transfer amount so as to obtain the gas emission amount vented through the relief valve when a pressure of the gas after the pressure change exceeds a working pressure of the relief valve.

2. The method of estimating a gas emission amount according to claim 1, wherein:
the relief valve includes a discharge vent; and
the gas vented through the relief valve is vented through the discharge vent to a recovery unit for recovering the volatile compounds contained in the gas.

3. The method of estimating a gas emission amount according to claim 1, wherein:
the storage tank includes a breather valve;
the first step further comprises: (e) setting a working pressure of the breather valve as one of the preconditions; and
the fourth step comprises obtaining an intake amount of the gas to be sucked through the breather valve when the pressure of the gas after the pressure change is lower than the working pressure of the breather valve.

4. The method of estimating a gas emission amount according to claim 3, wherein:
the breather valve includes an intake vent; and
the gas to be sucked through the breather valve comprises an inert gas supplied through the intake vent.

5. The method of estimating a gas emission amount according to claim 1, wherein the third step comprises identifying the change in temperature of the liquid, the change in temperature of the gas, and the change in the vapor-liquid equilibrium condition by calculating heat transfer due to convection of the liquid and the gas through the computational fluid dynamics analysis.

6. The method of estimating a gas emission amount according to claim 1, comprising:
setting new initial conditions for the second step based on the change in temperature of the liquid and the change in temperature of the gas, which are obtained in the third step, the change in pressure of the gas, which is obtained in the fourth step, and the storage volume of the gas in the storage tank, which is obtained from the change in pressure;
implementing the third step and the fourth step by defining a new inflow heat quantity to or a new outflow heat quantity from the liquid and the gas after the new initial conditions for the second step are set; and
obtaining a temporal change in the gas emission amount vented through the relief valve by repeating the setting of the new initial conditions for the second step and the implementation of the subsequent third step and fourth step.

7. The method of estimating a gas emission amount according to claim 6, wherein a maximum emission flow rate per unit time or a total gas emission amount vented within a preset time period is obtained based on the temporal change in the gas emission amount vented through the relief valve.

8. The method of estimating a gas emission amount according to claim 1, wherein the inflow heat quantity to or the outflow heat quantity from the liquid and the gas, which is determined in the third step, is determined based on heat energy supplied from sunlight to the storage tank through the partition wall.

9. The method of estimating a gas emission amount according to claim 8, wherein the heat energy supplied from the sunlight is determined from latitude and longitude of a spot where the storage tank is installed and a calendar day.

10. The method of estimating a gas emission amount according to claim 1, wherein the gas inside the storage tank contains the volatile compounds and other compounds; and
an emission amount of the volatile compounds is obtained based on the mass transfer amount between the liquid and the gas, which is obtained in the third step, and the gas emission amount obtained in the fourth step.

* * * * *